Aug. 2, 1966  O. A. HALEY  3,263,802
VIBRATORY CONVEYOR
Filed Nov. 7, 1962  2 Sheets-Sheet 2
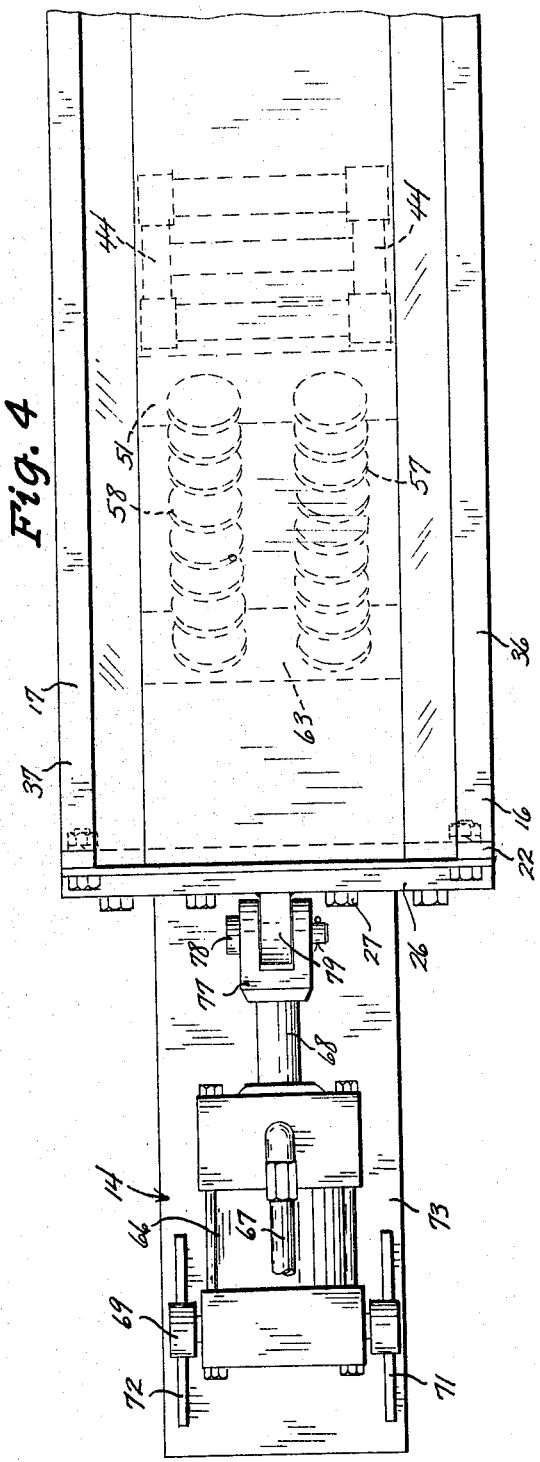
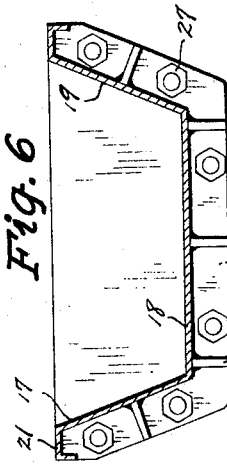
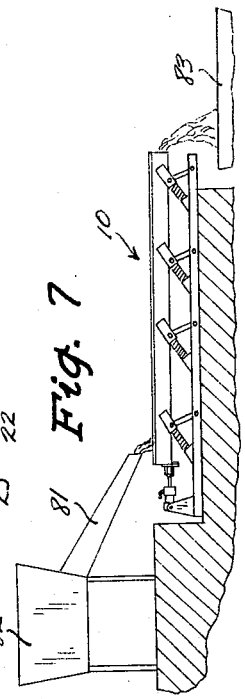
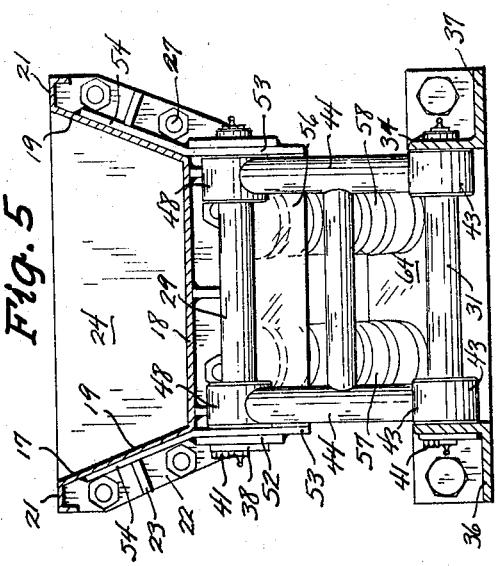
INVENTOR.
OLIVER A. HALEY
BY
Dick, Zarley & Henderson
ATTORNEYS

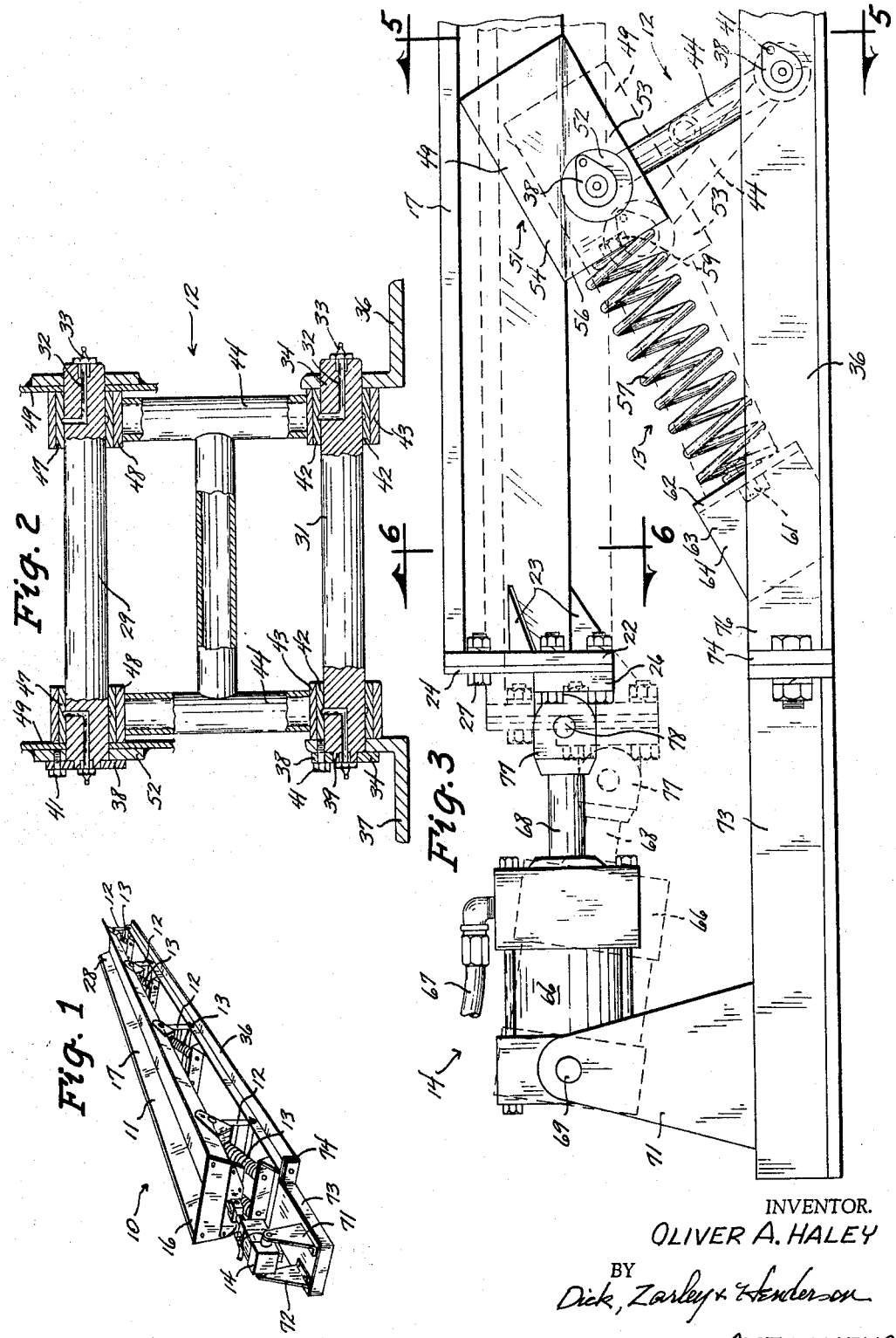

United States Patent Office 3,263,802
Patented August 2, 1966

3,263,802
VIBRATORY CONVEYOR
Oliver A. Haley, 730 14th St. Place, Nevada, Iowa
Filed Nov. 7, 1962, Ser. No. 235,985
4 Claims. (Cl. 198—220)

This invention pertains generally to material handling equipment, and more particularly to a conveyor apparatus of the vibratory type.

In many instances, the transfer and conveyance of granular and other like material over short distances can readily be accomplished by mechanical conveyors of the vibratory type. One instance is the transfer of animal feed from the storage bin to a feed bin or trough. Another instance is the transfer of fertilizer material from one location to another, yet another instance is the transfer of material from a stationary storage bin by gravity to the conveyor mechanism, and thence to a railroad car, barge or other conveyance mounted on a lower level and adapted to receive the material from the conveyor mechanism by gravity. To provide an improved vibratory conveyor is a primary object of this invention.

Another object of this invention is to provide a vibratory conveyor having a source of power which acts in one direction against the mechanism, and which is aided by a reciprocating biasing unit attached between a stationary support and a pan portion of the conveyor.

Yet another object of this invention is to provide a single, elongated conveyor pan mounted on a plurality of springs and movable simultaneously in a vertical and a horizontal plane by action of a source of power thereagainst.

A further object of this invention is to provide a rugged, structurally sound, economical vibratory conveyor which is simple in construction and effective in use.

These objects and other features and advantages of this invention will become readily apparent upon reference to the following description, when taken in conjunction with the accompanying drawings, wherein:

FIG. 1 is a perspective view of a preferred embodiment of the vibratory conveyor of this invention;

FIG. 2 is a fragmentary, enlarged side elevational view of a pivoting unit of the invention, certain parts being broken away and others shown in section for clarity of illustration;

FIG. 3 is an enlarged fragmentary side elevational view of the front end of the conveyor, with certain elements thereof shown in alternate positions by the use of full and dotted lines;

FIG. 4 is a plan view of the structure of FIG. 3;

FIG. 5 is a vertical sectional view taken along the line 5—5 in FIG. 3;

FIG. 6 is a vertical sectional view taken along the line 6—6 in FIG. 3; and

FIG. 7 is a greatly reduced pictoral representation of the conveyor of this invention shown in operation with other structures.

Referring now to the drawings, the vibratory conveyor of this invention is disclosed generally at 10 in FIGS. 1 and 7, and comprises generally a pan unit 11 (FIG. 1) resiliently mounted on a plurality of rocker arm units 12 mounted in co-action with a plurality of coil spring units 13. The pan unit 11 is set in motion by operation of a hydraulic unit 14 mounted at the front end 16 of the conveyor 10.

Specifically, the pan unit 11 of the conveyor 10 comprises an elongated, substantially U-shaped pan 17 (FIGS. 1 and 5). The pan 17 has a flat bottom wall 18, flat side walls 19 diverging upwardly and outwardly from the bottom wall 18, and terminating in flanged edges 21. At the front end 16 of the pan 17, a U-shaped flange 22 having a configuration complementary to the cross-sectional configuration of the pan 17 is secured thereto by a plurality of gussets 23 (FIGS. 1 and 6). The front end is closed by means of a flat cover plate 24 (FIGS. 4 and 5). The cover plate 24 and a mounting plate 26 (FIGS. 3 and 4) are secured to the flange 22 by means of a plurality of nut and bolt devices 27.

Although only one pan 17 is illustrated herein, it is contemplated that a plurality of pans 17 can be attached in an end-to-end manner, and be provided with the same resilient rocker arm units 12 and coil spring units 13 as described herein. Therefore, although the rear end 28 (FIG. 1) of the pan 17 as here illustrated as free, if attached to the front end of another pan, another flange identical to flange 22, and with the accompanying gussets 26 for securement to the pan, would be provided for attachment, for example, to the front flange and accompanying parts as described herein. Thus, for each junction of each adjacent pair of pans, a pair of flanges 22 and accompanying gussets and fastening devices would need to be provided.

Each rocker arm unit 12 (FIGS. 2, 3 and 5) comprises a pair of parallel, transversely extended shafts 29 and 31, each including oil passages 32 at each end for fluid fittings 33. The lower shaft 31 (FIG. 2) has its ends 34 inserted through openings provided in a pair of elongated angle irons 36 (FIGS. 1 and 2), which serve as a base for the conveyor 10. At the left end of the shaft 31 as viewed in FIG. 2, an oval shaped washer 38 (FIG. 3) is inserted over the reduced end 39 of the shaft 31 and is secured to the adjacent angle iron 36 by bolt 41.

Embracing the lower shaft 31 inside each angle iron 36 is a pair of bearing sleeves 42 about which are rotatably mounted the lower circular ends 43 of a pair of identical connecting rods 44. The upper circular ends 46 of the rods 44 are also rotatably mounted on a pair of bearing sleeves 47 which in turn embrace the upper shaft 29.

The arrangement for the upper shaft 29 is identical as the lower shaft 31, except that its ends 48 are inserted through a pair of wing portions 49 of a U-shaped bracket 51. Additionally, the ends 48 of the upper shaft 29 are inserted through a pair of circular washers 52 (FIGS. 2 and 3) shown as being welded to the wings 49, and to one of which the oval washer 38 is secured.

As best illustrated in FIGS. 3 and 5, each wing 49 includes a triangular vertical lower portion 53, to which the circular washers 52 are secured, and a triangular outwardly and upwardly diverging upper portion 54 which is secured as best illustrated in FIG. 5 to the side walls 19 of the pan, as by welding. Extended transversely across and below the pan bottom wall 18 is the front portion 56 of the bracket 51, the ends of which are integral with the lower edges of the wings 49. The front portion 56, as best illustrated in FIG. 3, depends angularly rearwardly from the bottom wall 18.

Each coil spring unit 13 (FIGS. 3 and 5) includes a pair of coil springs 57 and 58, the upper ends of which are attached by fastening devices 59 to the front portion 56 of the upper bracket 51. The lower ends of the coil springs 57 and 58 are also attached by fastening devices 61 to the front portion 62 of a U-shaped spring anchor bracket 63, the wing portions 64 of which are secured to the inner surfaces of the angle irons 36 and 37.

Referring to FIG. 3, it is readily seen that the front portions 62 and 56 face each other in proper axial alignment for effective mounting of the coil springs 57 and 58 therebetween. In the normal position and condition of the coil springs 57 and 58, they are expanded as illustrated in full lines in FIG. 3, and with the rocker arm unit 12 of FIG. 3 disposed in its full line position. Furthermore, as best illustrated in FIG. 3, in this normal position of both the coil spring unit 13 and the rocker arm unit 12, the pan unit 11 is disposed in the full line position of FIG. 3.

To initiate oscillation of the pan 17 in both vertical and horizontal directions, the hydraulic unit 14 is provided. The unit 14 includes a single acting piston and cylinder device 66 (FIGS. 3 and 4) which is supplied fluid at one end thereof by a conduit 67 from a source of fluid (not shown). A systematic, sequential and timed supply of fluid through the conduit 67 provides sequential retraction and extension of the normally extended piston rod 68. The piston and cylinder device 66 is pivotally mounted at 69 to a pair of uprights 71 and 72 the bases of which are secured to a platform 73. One end of the platform is attached to a base end plate 74 (FIG. 3) which is secured to the front end 76 of the angle irons 36.

The piston rod 68 has a bifurcated yoke 77 secured to its rear end and which is pivotally connected by a pin 78 to an apertured projection 79. The projection 79 extends forwardly from the central portion of the mounting plate 26. Thus, reciprocatory movement of the piston rod 68 is transmitted to the conveyor pan 17. In operation of the vibratory conveyor 10, assume the conveyor is mounted on the ground as illustrated in FIG. 7, with the front end 16 of the pan 17 disposed below a trough 81 depending from a storage tank 82. The outer or rear end 28 of the pan 17 is disposed above a railway hopper car 83 (only a portion of which is shown).

Upon operation of the fluid supply through the conduit 67, the piston rod 68 is retracted. Due to the pivotal position of the four rocker arm units 12 and their accompanying coil spring units 13, the retraction movement of the piston rod 68 causes the pan 17 to move forwardly and downwardly to the dotted line position of FIG. 3. This movement results in a compression of the coil springs 57 and 58 which resist the forward and downward movement of the pan 17 via the brackets 51.

Conversely, the rearward and upward movement of the pan 17, from the dotted line position of FIG. 3 back to the full line position thereof, in response to the extension of the piston rod 68, is aided as to the force behind the movement by the expansion of the coil springs 57 and 58 of each spring unit 13. It may well be appreciated, therefore, that in response to the quicker and more forceful rearward and upward movement of the pan 17, as compared to the spring resisted forward movement thereof, that the granular material in the pan 17 from the trough 81 will be vibrated rearwardly of the pan 17 for discharge out of the rear end thereof and into the hopper car 83.

Some changes may be made in the construction and arrangement of my vibratory conveyor without departing from the real spirit and purpose of my invention, and it is my intention to cover by my claims, any modified forms of structure or use of mechanical equivalents which may be reasonably included within their scope.

I claim:

1. A vibratory conveyor apparatus for conveying a material or the like comprising in combination:
   a base;
   pan means adapted to support the material and open at one end for discharging the material therefrom;
   power means pivotally connected at one end to said pan means at one end thereof and operable to reciprocate said pan means logitudinally; said power means pivotally connected at its other end to said base;
   rocker arm means pivotally mounted on said base and pivotally connected to said pan means, and arcuately movable in a plane parallel to the longitudinal axis of said pan means, whereby an oscillatory movemeans of said pan means is obtained in response to operation of said power means; and
   said power means including a fluid operated piston and cylinder device having a piston rod pivotally connected to said pan means, said piston rod being fluid powered to an inwardly extending position to move said pan means in one direction, a spring means operatively connected to said pan means and operable in response to the oscillatory movement thereof to resist the movement of said pan means in said one direction to prevent the movement of the material with respect to said pan means, and to move said pan means in an opposite direction to move the material longitudinally in said pan means.

2. A vibratory conveyor apparatus for conveying a material or the like comprising in combination:
   a base;
   pan means adapted to support the material and being open at one end thereof for discharging the material therefrom;
   power means operatively connected to said pan means at an end thereof opposite said open end and operable to reciprocate said pan means longitudinally;
   rocker arm means including a transversely spaced pair of arms pivotally mounted at their bottom ends to said base and pivotally connected at their upper ends to the bottom of said pan means, said arms movable through planes parallel to the plane of movement of said pan means and adapted to effect an oscillatory movement to said pan means in response to operation of said power means; and
   said power means including a fluid operated piston and cylinder device having a piston rod pivotally connected to said pan means, said piston rod being fluid powered to an inwardly extending position to move said pan means in one direction, a coil spring means operatively connected to said pan means and operable in response to the oscillatory movement thereof to resist the movement of said pan means in said one direction to prevent the movement of the material with respect to said pan means, and to move said pan means in an opposite direction to move the material longitudinally in said pan means.

3. A vibrating conveyor apparatus for conveying a material or the like comprising in combination,
   a base,
   pan means adapted to support the material and open at one end for discharging the material therefrom,
   power means pivotally connected at one end to said pan means at one of its ends and operable to reciprocate said pan means longitudinally,
   said power means pivotally connected at its other end to said base,
   rocker arm means pivotally mounted on said base and pivotally connected to said pan means, and arcuately movable in a plane parallel to the longitudinal axis of said pan means, whereby an oscillatory movement of said pan means is obtained in response to operation of said power means,
   and spring means operatively connected to said pan and operable in response to the oscillatory movement thereof to resist movement of said pan means in one direction and to aid movement of said pan means in an opposite direction,
   said power means includes a fluid operated piston and cylinder device having a piston rod pivotally connected to said pan means, said rod normally biased to an outwardly extending position and fluid powered to an inwardly extending position,
   said rocker arm means includes a transversely spaced pair of arms pivotally mounted at their bottom ends to said base and pivotally mounted at their upper ends to the bottom of said pan means, said arms movable through planes parallel to the plane of movement of said pan means and adapted to effect an oscillatory movement to said pan means in response to operation of said power means,
   said spring means being conected at one end to said base and at the other end to said pan means, and having the axis of compression and expansion thereof disposed angularly to the longitudinal axis of said pan means, said spring means yieldably opposing said power means when said piston rod is fluid powered to an inwardly extending position and said pan is moved in said one direction.

4. A vibratory conveyor apparatus for conveying a material or the like comprising in combination, a base, pan means including an elongated U-shaped pan open at one end for discharging therefrom a material from within said pan, power means including a fluid operated piston and cylinder device having a piston rod pivotally connected to said pan means, said rod normally biased to one position and fluid powered toward another position, wherein operation of said device results in longitudinal reciprocation of said pan means, rocker arm means pivotally mounted on said base and pivotally connected to said pan means and arcuately movable in a plane parallel to the longitudinal axis of said pan means, whereby an oscillatory movement of said pan means is obtained in response to operation of said power means, and spring means operatively connected to said pan means and operable in response to the oscillatory movement thereof to resist movement of said pan means in one direction and to aid movement of said pan means in an opposite direction, said power means pivotally connected to said base, said spring means including a plurality of coil springs connected at one end to said base and at the other end to said pan means and having an axis of compression and expansion disposed angularly to the longitudinal axis of said pan means, whereby in response to the oscillatory movement of said pan means, said spring means is adapted to resist movement of said pan means in one direction and to aid movement of said pan means in an opposite direction, said spring means yieldably opposing said power means when said piston rod is fluid powered to an inwardly extending position.

References Cited by the Examiner

UNITED STATES PATENTS

| | | | |
|---|---|---|---|
| 2,157,367 | 5/1939 | Warner | 121—38.23 |
| 2,636,288 | 4/1953 | Thomas. | |
| 2,772,769 | 12/1956 | Behnke | 198—220 |
| 2,854,130 | 9/1958 | Adams. | |
| 2,868,357 | 1/1959 | Thomas | 198—220 |
| 3,019,889 | 2/1962 | Carrier | 198—220 |

FOREIGN PATENTS 168,160  9/1921  Great Britain.

EVON C. BLUNK, *Primary Examiner.*

EDWARD A. SROKA, SAMUEL F. COLEMAN,
*Examiners.*